(12) United States Patent
Ball (10) Patent No.: US 8,672,633 B2
(45) Date of Patent: Mar. 18, 2014

(54) VERTICAL AXIS WIND TURBINE

(76) Inventor: John Bradley Ball, Lakeside (CA)

( * ) Notice: Subject to any disclaimer, the term of this patent is extended or adjusted under 35 U.S.C. 154(b) by 560 days.

(21) Appl. No.: 12/880,045

(22) Filed: Sep. 10, 2010

(65) Prior Publication Data

US 2011/0116930 A1     May 19, 2011

Related U.S. Application Data

(60) Provisional application No. 61/241,399, filed on Sep. 11, 2009.

(51) Int. Cl.
    *F03D 3/02* (2006.01)
(52) U.S. Cl.
    USPC ................. 416/197 A; 415/907; 416/243
(58) Field of Classification Search
    USPC ............. 415/2.1, 4.1, 4.2, 4.4, 905, 907;
            416/197 R, 197 B, 197 A, 243, 178, 187,
            416/182, 185, 186 R; 290/44, 43, 54, 55
    See application file for complete search history.

(56) References Cited

U.S. PATENT DOCUMENTS

| | | | |
|---|---|---|---|
| 617,555 A * | 1/1899 | Blue et al. | ................. 416/197 R |
| 4,359,311 A | 11/1982 | Benesh | |
| 4,784,568 A | 11/1988 | Benesh | |
| 4,838,757 A | 6/1989 | Benesh | |
| 5,494,407 A * | 2/1996 | Benesh | .................... 416/197 A |
| 6,808,366 B2 | 10/2004 | Sikes | |
| 6,966,747 B2 * | 11/2005 | Taylor et al. | ..................... 415/1 |
| 7,008,171 B1 * | 3/2006 | Whitworth | .................... 415/4.2 |
| 7,314,346 B2 | 1/2008 | Vanderhye et al. | |
| 7,344,353 B2 | 3/2008 | Naskali et al. | |
| 7,393,177 B2 | 7/2008 | Rahai et al. | |
| 2004/0265116 A1 * | 12/2004 | Kaneda | ......................... 415/4.2 |

\* cited by examiner

*Primary Examiner* — Edward Look
*Assistant Examiner* — Juan G Flores
(74) *Attorney, Agent, or Firm* — Brunet & Co. Ltd.; Robert A. H. Brunet (57) ABSTRACT

A vertical axis wind turbine comprising at least two rotor portions, each portion having a bottom, a top, and a curved horizontal cross section when seen in top view. A top cap may be provided that has a convex portion corresponding to each rotor portion that extends forwardly in a windward direction. Each rotor portion may comprise two angled rotor sections that meet at substantially a vertical midpoint of the rotor portion. The angled sections may be angled rearwardly in a leeward direction and/or radially and may be angled from 1 to 20 degrees with respect to vertical. There may be three or more rotor portions and the turbine may be comprised of one or more vertically stacked sections.

20 Claims, 12 Drawing Sheets

VERTICAL AXIS WIND TURBINE

CROSS-REFERENCE TO RELATED APPLICATIONS

This application claims the benefit of U.S. patent application 61/241,399, filed Sep. 11, 2009, which is incorporated herein by reference.

FIELD OF THE INVENTION

The invention relates to improvements in vertical axis wind turbines. More particularly, the invention relates to aerodynamic improvements in turbines comprising a curved airfoil.

BACKGROUND OF THE INVENTION

Vertical axis wind turbines, or VAWT's, are known for use in power generation and water pumping applications. Savonius wind turbines are one type of vertical-axis wind turbine, used for converting the power of the wind into torque on a rotating shaft. They were invented by the Finnish engineer Sigurd J Savonius in 1922. Savonius turbines are one of the simplest turbines. Aerodynamically, they are drag-type devices. Because they are drag-type devices, Savonius turbines extract much less of the wind's power than other similarly-sized lift-type turbines. Reported power coefficients for Savonius turbines vary from about 0.15 to about 0.30.

Another type of VAWT that combines both lift and drag characteristics is described in the following U.S. Pat. Nos. 4,359,311; 4,715,776; 4,784,568; 4,830,570; 4,838,757; and, 5,494,507, all to Alvin Benesh. The turbine that is described in these patents is an improvement over typical Savonius style turbines, but still includes room for improvements in efficiency and manufacturing.

There is therefore a need for further improvements in vertical axis wind turbines.

SUMMARY OF THE INVENTION

According to the present invention, there is provided a vertical axis wind turbine having at least one turbine section comprising at least two rotor portions, each portion having a bottom, a top, and a curved horizontal cross section when seen in top view, the section comprising a top cap having a convex portion that extends in a windward direction relative to the horizontal cross section of each rotor portion.

According to another aspect of the present invention, there is provided a vertical axis wind turbine having at least one turbine section comprising at least two rotor portions, each portion having a bottom, a top, and a curved horizontal cross section when seen in top view, each rotor portion comprising two angled rotor sections that meet at substantially a vertical midpoint of the rotor portion.

The angled sections may be separate pieces that are joined together at an angle to one another or a single piece that is formed with an included angle. The angled sections may form a rearward or leeward angle with respect to vertical when seen in side view. The rearward or leeward angle may be from 1 to 20 degrees, preferably from 1 to 15 degrees, more preferably from 1 to 10 degrees, yet more preferably from 1 to 5 degrees, even more preferably from 1 to 3 degrees, most preferably about 2 degrees. The angled sections may alternatively or additionally form a radial angle with respect to vertical when seen in front view. The radial angle may be from 1 to 20 degrees, preferably from 1 to 15 degrees, more preferably from 1 to 10 degrees, yet more preferably from 1 to 5 degrees, even more preferably from 1 to 3 degrees, most preferably about 2 degrees.

The turbine has a centrally located vertical axis and may further comprise a central vertical shaft. A central shaft is not required to extract power from the turbine, as the structure of the turbine can be made quite rigid when the sections are assembled so that power can be extracted from the bottom of the turbine, for example using a large diameter ring gear or a stub shaft. In this embodiment, it may be advantageous to stabilize the turbine with circumferentially spaced apart magnetic levitation bearings between a bottom disc of the turbine and a lower support structure of equivalent diameter, for example a lower disc or lower ring structure.

The direction of rotation of the turbine is with the prevailing wind direction. As such, the windward direction is "upstream" or forward of the rotor portion and the leeward direction is "downstream" or rearward of the rotor portion. The rotor portions may be laterally offset from one another along a radius of the turbine. The rotor portions may overlap along the radius of the turbine at a center of the turbine. Each rotor portion has a curved horizontal cross section which may comprise a straight portion and a curved leading edge to thereby form an airfoil shape when viewed in top view. The airfoil shape may therefore have a substantially concave interior when seen from a side or top view. The direction of rotation may be towards the concave side of the curved horizontal cross section when seen in top view.

The turbine may comprise a plurality of vertically stacked sections, each section comprising at least two rotor portions. The turbine may comprise a single section or two or more vertically stacked sections. The turbine may comprise five vertically stacked sections. At least one section may comprise three rotor portions.

Each rotor portion may have at least one horizontal interior brace, within the concave side or windward side, to enhance structural rigidity of the turbine. The brace may be positioned at substantially the vertical midpoint of the rotor portion. The brace may be "open", i.e. it may contain one or more apertures to permit the passage of air through the brace.

Each rotor portion may have a top cap that is different in size and/or area from the cross-sectional shape of the rotor portion when seen in top view. The top cap may extend radially outwardly from the center of the turbine to a lesser distance than the rotor portion when seen in top view. The top cap may extend radially past the dimensions of the rotor portion when seen in top view. The top cap may have a convex portion that extends forwardly in a windward direction from the horizontal cross section of each rotor portion.

It has surprisingly been found that by introducing an angle from vertical into each rotor portion, an improvement in torque can be obtained, which translates to an improvement in power output for the turbine at certain wind speeds. It has also surprisingly been found that introducing a top cap with a forwardly extending convex portion corresponding to each rotor portion increases the power output of the turbine. These findings are particularly unexpected, given that drag based wind turbines have been studied for many years. However, since these types of turbines are relatively inexpensive to build and maintain, the improvements are expected to have great practical significance, particularly in less developed and/or poorly serviced parts of the world.

BRIEF DESCRIPTION OF THE DRAWINGS

Having summarized the invention, preferred embodiments thereof will now be described with reference to the accompanying figures, in which:

FIG. 2b is a side view of the embodiment shown in FIG. 2a;

FIG. 6b is an end view of the wind tunnel of FIG. 6a;

DETAILED DESCRIPTION

Throughout the Detailed Description, like features will be described by like reference numerals. Though all reference numerals used in describing a particular drawing may not be shown on that actual drawing, other drawings showing and describing that particular reference numeral may be referred to.

Figure 1:
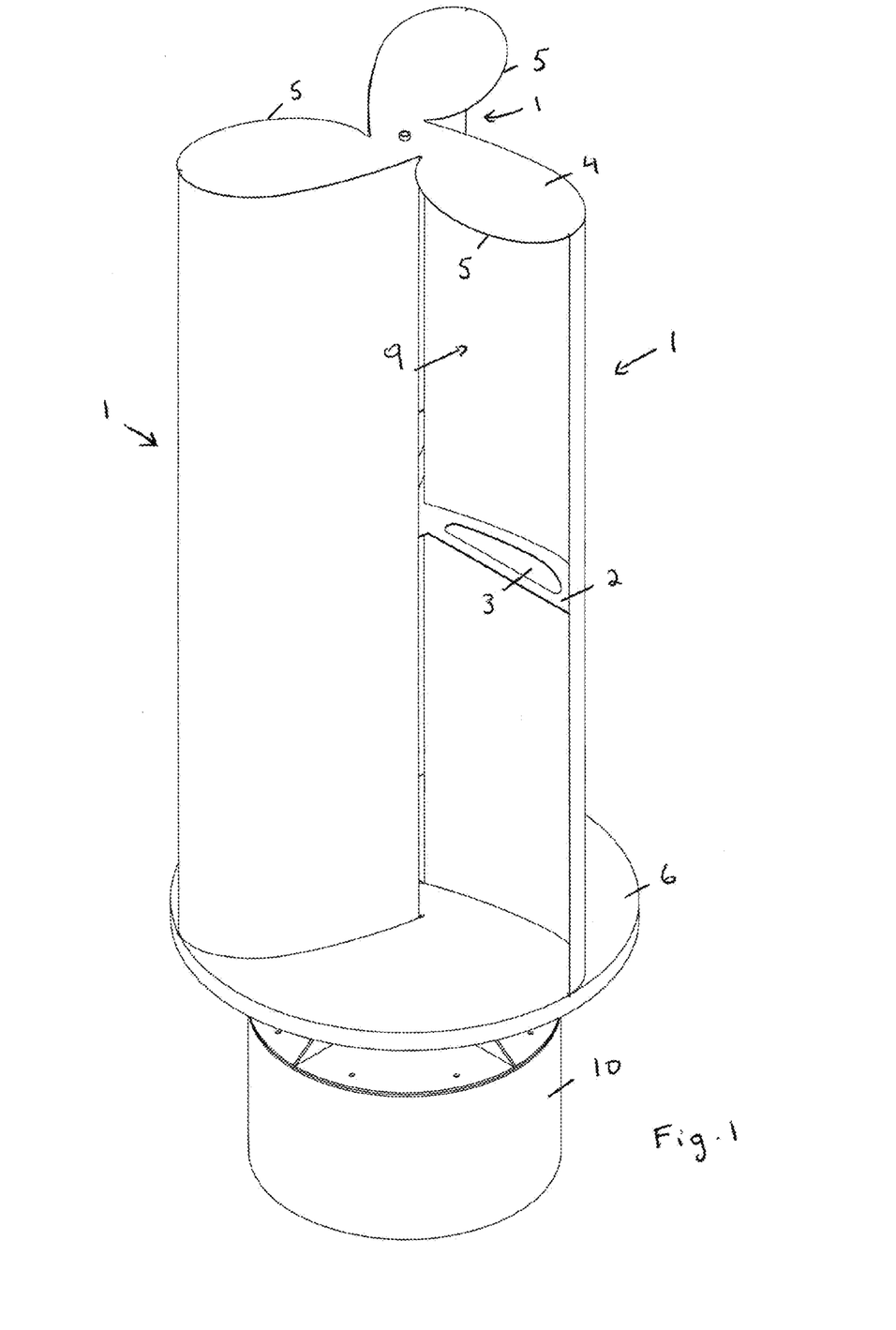
FIG. 1 is a perspective view of an embodiment of a vertical axis wind turbine according to the present invention, comprising three rotor portions and a single section.

Referring to FIG. 1, each rotor portion 1 has a curved horizontal cross-section with a substantially airfoil shape when seen in top view. Each rotor portion has a concave side 9 and the turbine rotates in the direction of the concave side (i.e. counterclockwise in the figure). Without wishing to be limited by theory, it is believed that the turbine combines the characteristics of both lift based and drag based VAWT's as the turbine rotates. During rotation, the airfoil portions are oriented towards the wind direction with a varying angle of attack. As the turbine continues to rotate, the concave side is exposed to the oncoming wind and the rotor portion functions in drag mode. However, by providing three rotor portions, rather than two, some of the rotor portions operate in lift mode while others operate in drag mode. Improved performance is thereby obtained.

Each rotor portion 1 has a horizontal divider or brace 2 with an aperture 3 therein to permit airflow through the divider. The divider 2 is located at the vertical midpoint of each rotor portion. By providing an aperture in the divider for airflow, improved performance is obtained while stiffening each rotor portion.

A top cap 4 is provided atop each rotor portion 1. The top cap 4 has a convex portion 5 corresponding to each rotor portion that extends forwardly, towards the concave or windward side 9, relative to the horizontal cross section of the rotor portion 1. In some embodiments, the top cap 4 may extend radially outwardly to a lesser extent than the rotor portion 1.

Each rotor portion 1 is mounted to a bottom disc 6. The turbine does not comprise a central shaft and imparts power to the optional bottom generator 10 by a stub shaft (not shown) extending from the bottom of the disc 6. The use of the dividers 2 imparts sufficient structural rigidity to the rotor portions 1 that a central shaft is not needed.

Figure 2A:
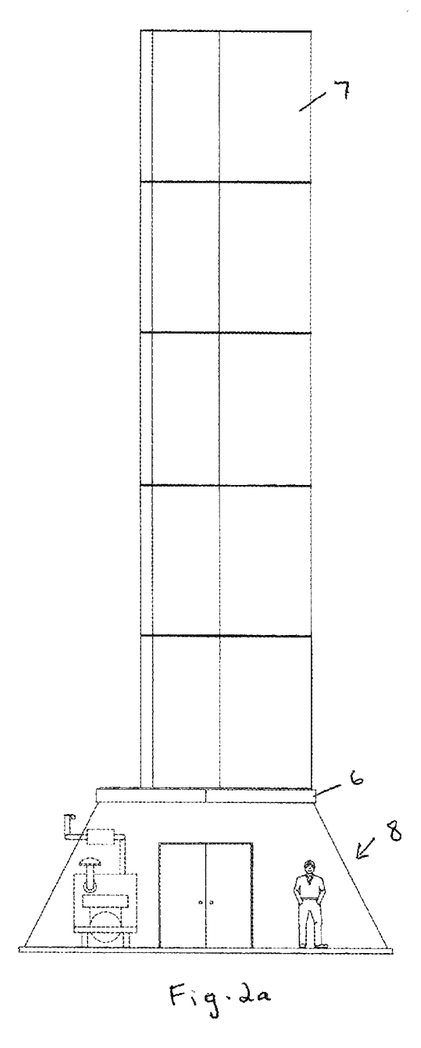
FIG. 2a is a front view of an embodiment of the turbine when fully assembled comprising five vertically stacked sections, each section as shown in FIG. 1.
Figure 2B:
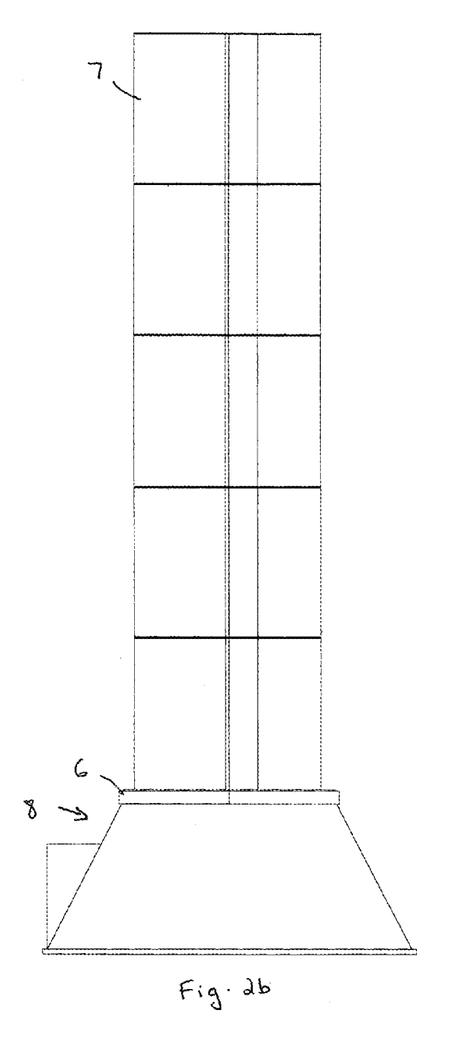
Figure 3:
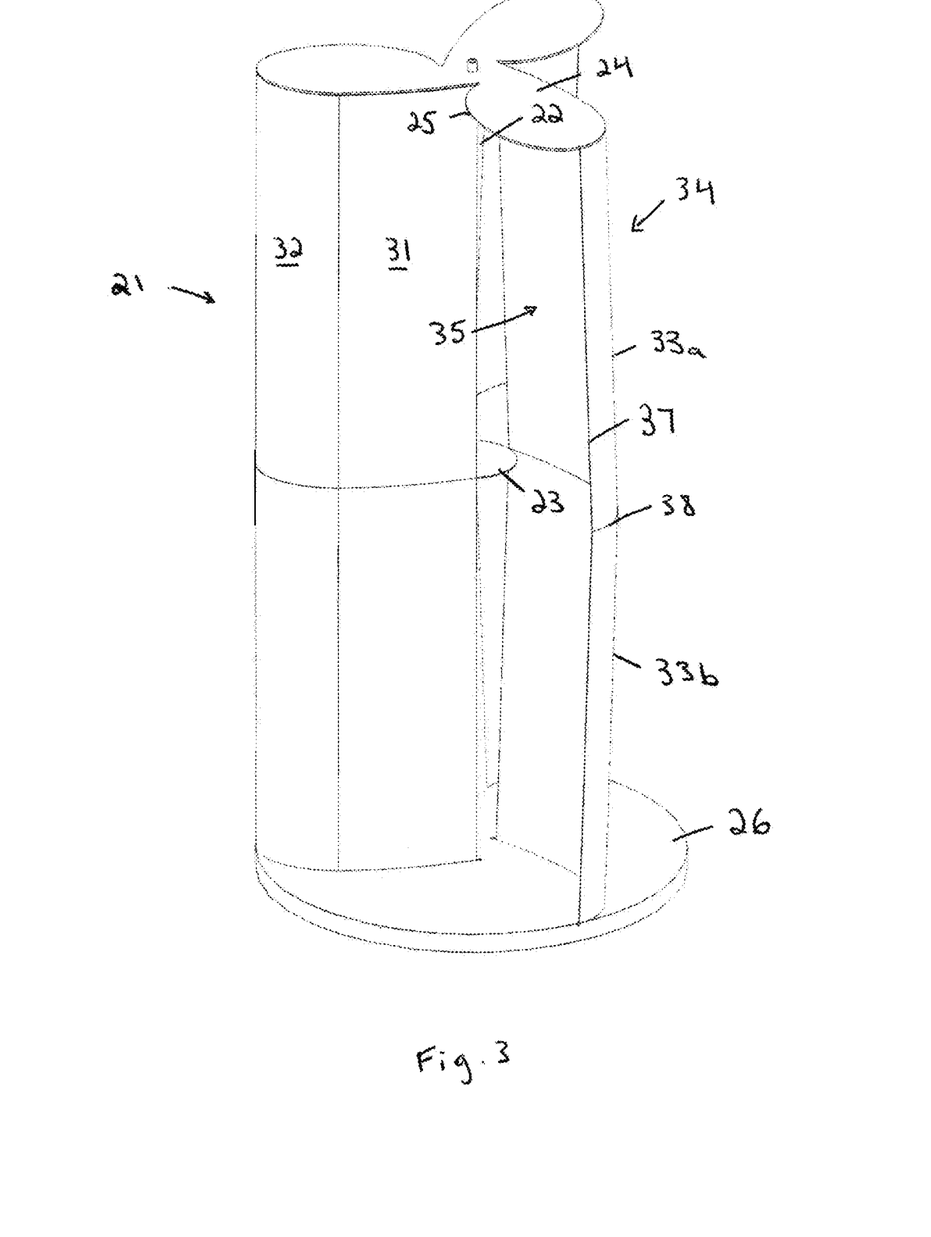
FIG. 3 is a perspective view of another embodiment of a vertical axis wind turbine according to the present invention, comprising three leewardly angled rotor portions.

Referring to FIGS. 2a and 2b, a full scale version of the invention may comprise 5 or more vertically stacked sections 7 of the embodiment of the turbine shown in FIG. 1 (minus the generator 10). A support structure 8 may be provided below the bottom disc 6 that also acts as a utility building. A support ring (not shown) may be provided between the support structure 8 and the bottom disc 6 and may be separated therefrom by magnetic levitation bearings (not shown) about the circumference of the disc 6.

Referring to FIGS. 3 and 4a-4c, another embodiment of the turbine is shown having three rotor portions 21, each having a curved horizontal cross-sectional shape comprising a straight portion 31 and a curved portion 32. Each rotor portion comprises two angled portions 33a and 33b that meet at substantially the vertical midpoint of the rotor portion 21. The angled portions 33a and 33b are rearwardly angled toward the leeward side 34 of the turbine, which rotates counter-clockwise when engaged by the wind on its windward side 35.

A central shaft 22 passes through the center of the turbine and is used to transmit power down to connected equipment below the turbine. A central disc 23 is provided as a mounting point for the rotor portions 21 to the shaft 22 at substantially the vertical mid-point of the rotor portions. A bottom disc 26 is provided for securely mounting the rotor portions 21.

Figure 4A:
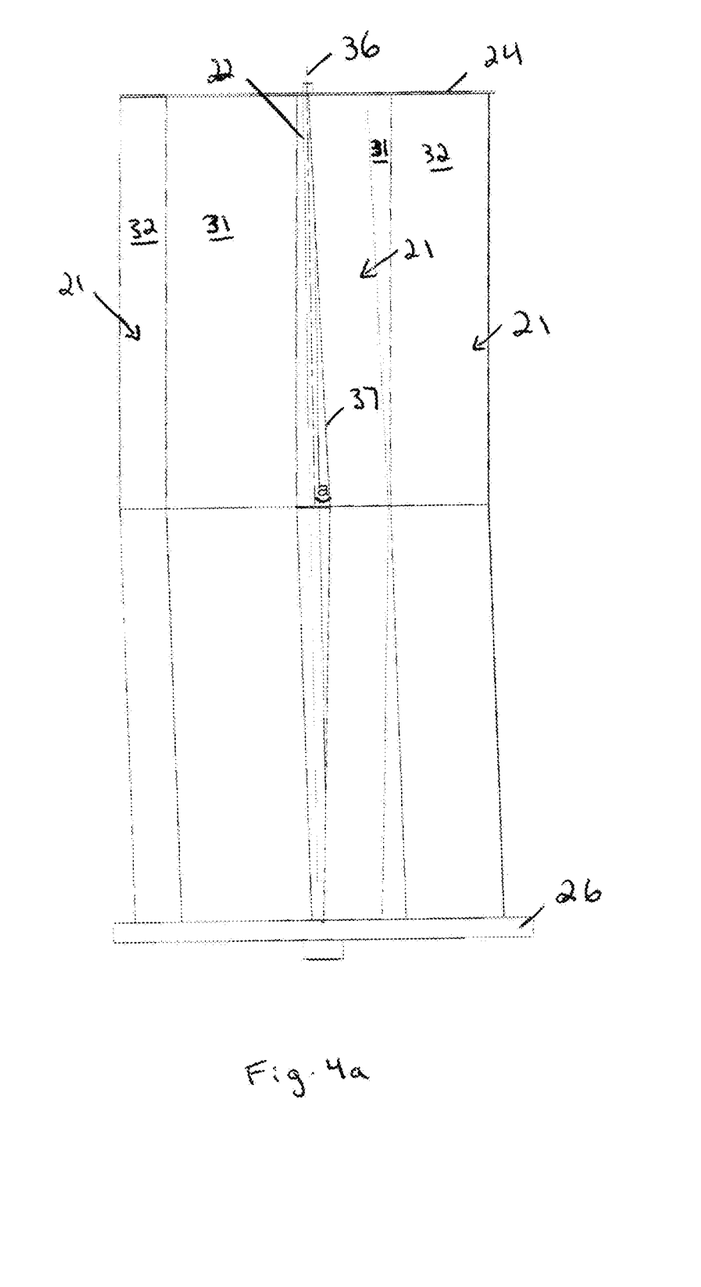
FIG. 4a is a side view of the embodiment shown in FIG. 3.
Figure 4B:
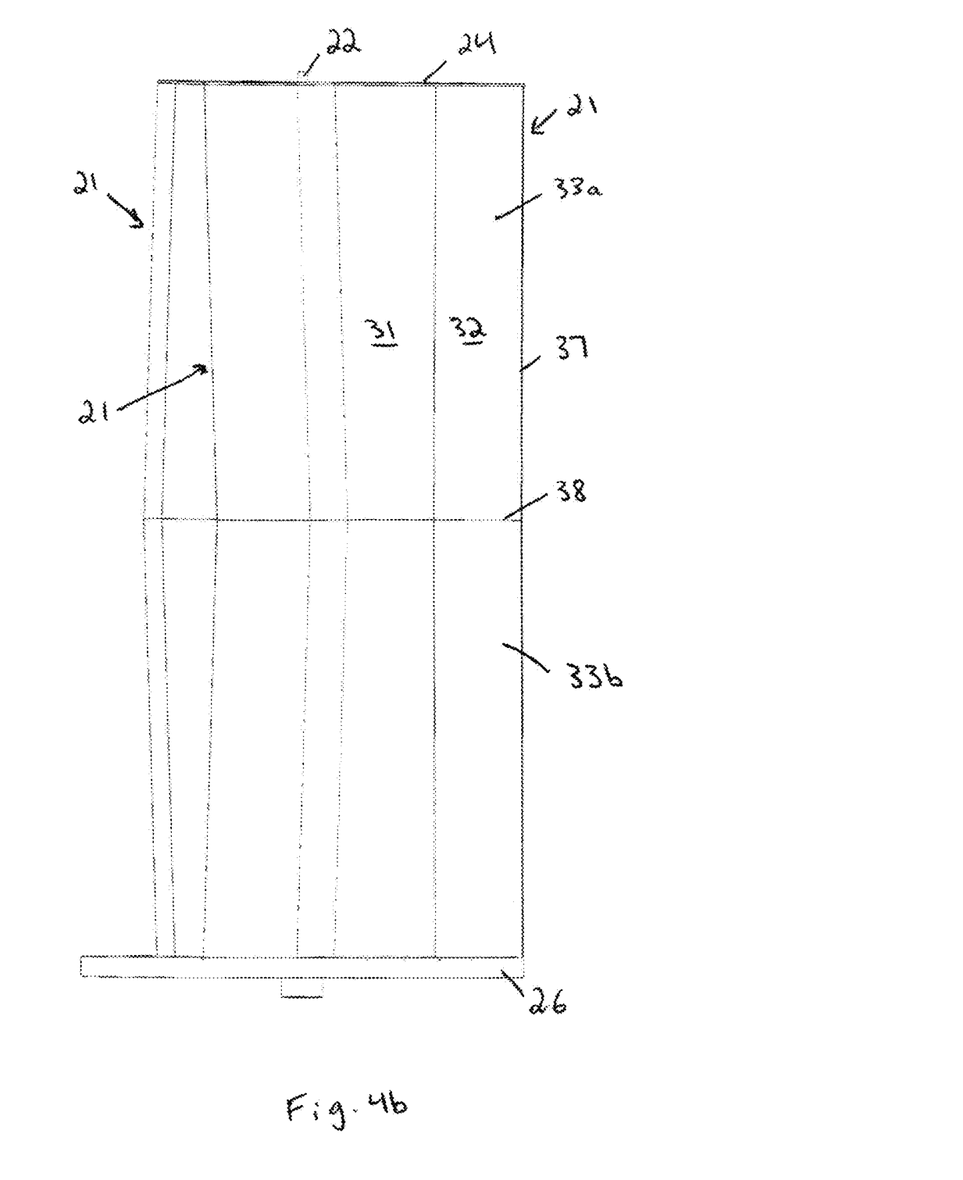
FIG. 4b is a front view of the embodiment shown in FIG. 3.

The angle in the leeward direction is best seen with reference to FIG. 4a, which shows a vertical axis of rotation 36. When the leading edge 37 of the turbine is seen in side view, the angle a defined between the leading edge 37 and the vertical axis 36 is the leeward angle. In the embodiment shown, the angle a is about 2 degrees. Referring to the front view of the turbine in FIG. 4b, the leading edge 37 appears as a vertical line. In this embodiment, there is no radial angle provided.

Figure 4C:
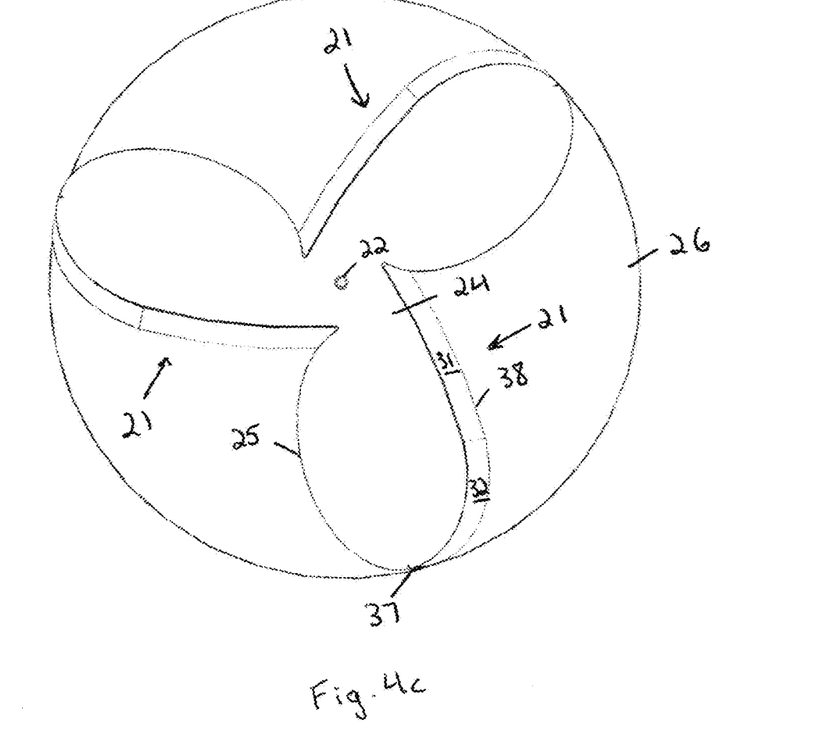
FIG. 4c is a top view of the embodiment shown in FIG. 3.

Referring to FIG. 4c, in top view the meeting of the upper and lower angled portions 33a and 33b (33b not shown in top view) occurs at the intersection 38. The intersection 38 is visible in top view due to the leeward angle between the upper and lower angled portions. Referring additionally to FIG. 3 again, the top cap 24 is also shown and comprises a convex portion 25 corresponding to each rotor portion 21. The convex portions 25 extend forwardly in a windward direction relative to the horizontal cross section of the rotor portions 21.

Figure 5:
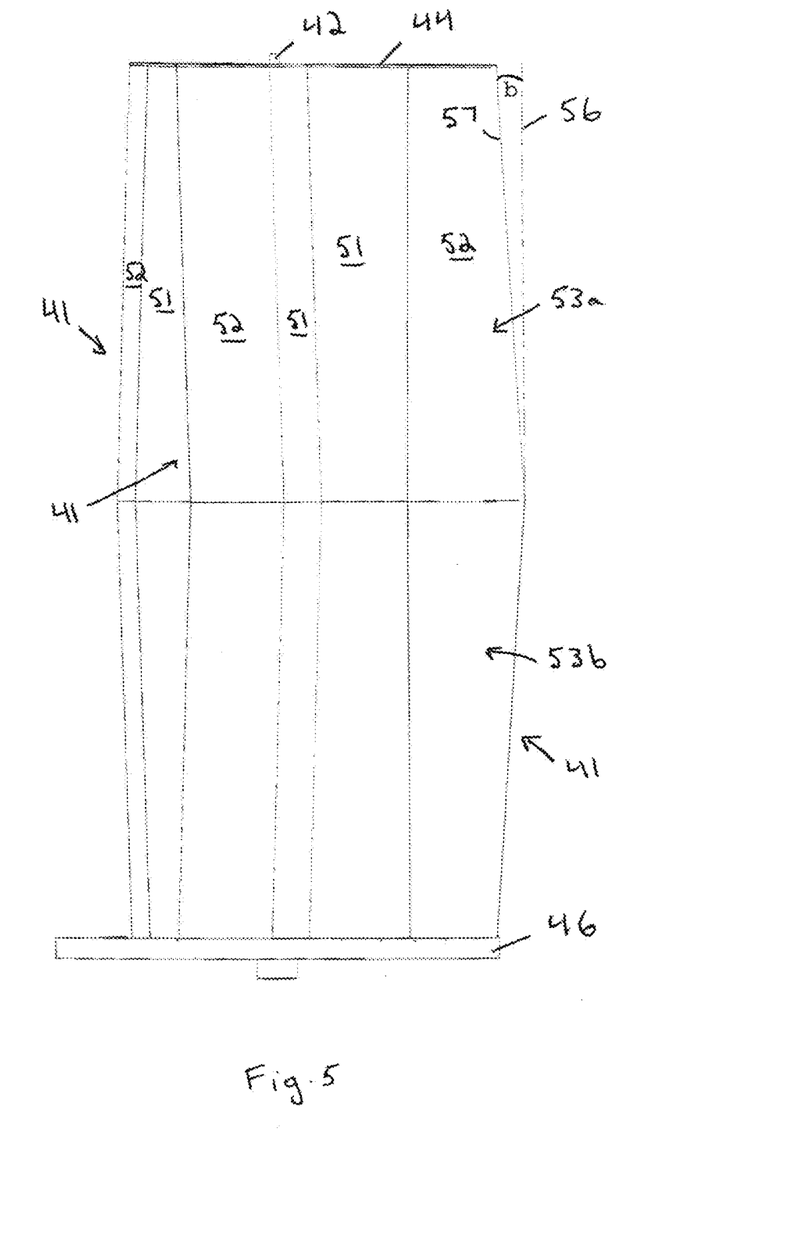
FIG. 5 is a front view of another embodiment of a vertical axis wind turbine according to the present invention, comprising three radially angled rotor portions.

Referring to FIG. 5, another embodiment of the turbine is shown in front view. This embodiment comprises three rotor portions 41, each having a curved horizontal cross-sectional shape comprising a straight portion 51 and a curved portion 52. Each rotor portion comprises two angled portions 53a and 53b that meet at substantially the vertical midpoint of the rotor portion 41. The angled portions 53a and 53b are radially outwardly angled, as evidenced by the radial angle b between the vertical reference line 56 and the leading edge 57. In the embodiment shown, the angle b is about 2 degrees. A central shaft 42, top cap 44 and bottom disc 46 are also shown in this figure.

EXAMPLES

Wind tunnel testing of scale models was performed in a double open ended flow through wind tunnel. The tunnel will be described with reference to FIGS. 6a and 6b. The main body 61 of the wind tunnel was constructed of sheet metal and had an overall length of 168", inside height of 47.5" and inside width of 30". The exit end 62 of the wind tunnel was the full size of the main body. At the inlet, or blower end 63 of the tunnel, a portion of the cross section of the tunnel was occupied by the blower exit opening, which had a height of 13", a width of 24" and was centered with the bottom of its opening 13" above the floor of the main body 61 of the tunnel. The blower 68 was manufactured by Gould and had a ½ Hp, 120 VAC motor. By providing an opening at the blower end, additional room air was sucked into the tunnel, without having to flow through the blower. This significantly increased air flow through the tunnel, generally averaging 5.0-5.3 m/s near the top of the tunnel. A flow distributor and straightener 64 was provided 52" from the blower end 63 of the tunnel in order to aid in providing well distributed smooth flow. The distributor and straightener 64 filled the entire tunnel cross-section and was comprised of horizontally oriented paper cores, each 11" long with a 2¼" I.D. opening. These provided an air flow in the testing area 65 that was about 15% greater than at the wall, or about 6.0 m/s.

Figure 6A:
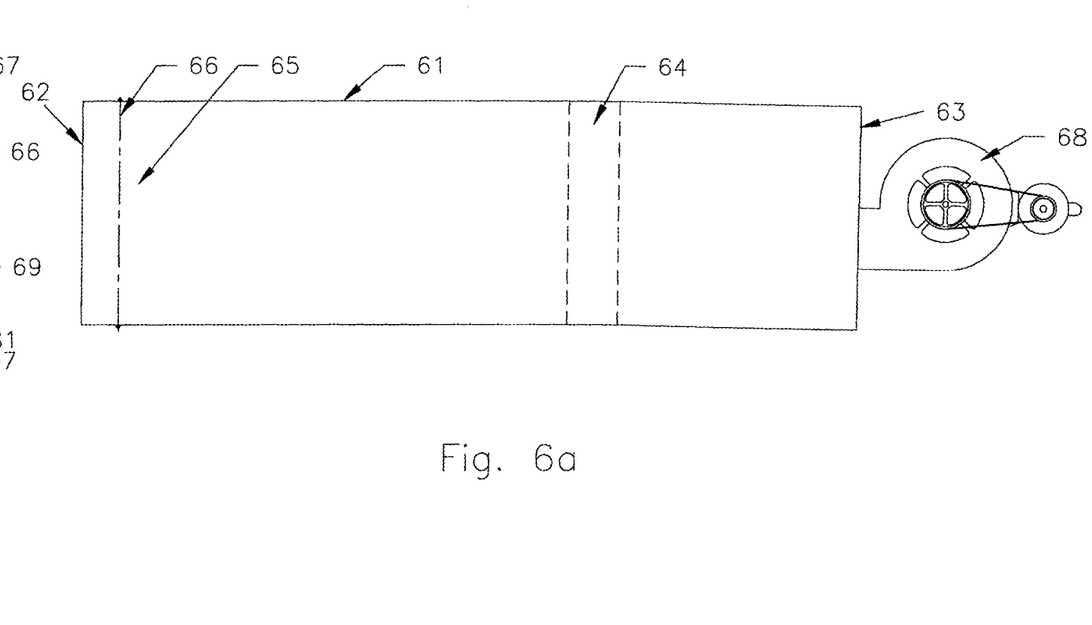
FIG. 6a is a side view of a wind tunnel used for performance testing of wind turbine models.
Figure 6B:
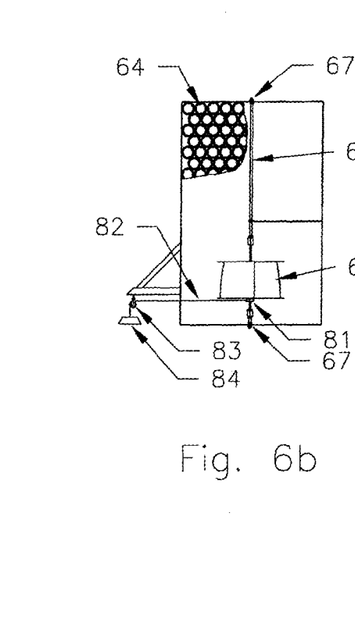

The testing area 65 was located 150" into the tunnel from the blower end 63. Models 69 were mounted on a shaft 66 comprising a length of ¼"-20 threaded rod that was secured vertically within ball bearings 67 mounted to the top and bottom of the tunnel. A 1½" diameter steel prony brake pulley 81 was secured to the rod about 4" above the tunnel floor. A braided polypropylene cord 82 was half-wrapped about the circumference of the pulley, with one end secured to the interior wall of the tunnel and the other end passing through the tunnel wall and over a second 1½" diameter idler pulley 83. A weight receptacle 84 was hung from the free end of the cord to provide a variable tension on the cord according to the amount of weight in the receptacle. This prony brake system allowed a measurable and controlled amount of resistance to be applied to the shaft in order to allow relative torque measurements to be made for the models.

Air temperature was not controlled, but was in the range of 5 to 15° C. throughout the testing. Although it was noticed that warmer temperatures caused a decline in performance, all comparison tests were conducted while room temperature changed very little, about +/−2° C. A non-contact laser hand held sensor was used to measure RPM by directing it toward a small piece of reflective tape attached to the exterior of the model being tested.

Models were made from steel. For relative comparisons, a single section model was tested.

By combining the brake torque and rpm measurements, a relative power output for each model could be calculated. This allowed comparison between models in order to determine the impact of changes to the leading edge angle and/or model configuration on power output at constant wind tunnel conditions. The relative power was calculated according to the following procedure.

Power is defined by, $$P(W)=Force(N)*Distance(m)/Time(s); \quad (1)$$

where the product of Force and Distance is otherwise known as Torque. For a prony brake, Force is the pulley friction defined by:

$$F(N)=T_2(N)-T_1(N); \quad (2)$$

where $T_2$ is the tension measured on one side of the pulley and $T_1$ is the tension measured on the opposite side of the pulley. For a rotating pulley, $T_2$ is defined by a relationship with $T_1$ where:

$$T_2=T_1 e^{(\mu_k \beta)}; \quad (3)$$

where $\mu_k$ is the coefficient of kinetic friction between the cord and the pulley and $\beta$ is the angle between the cord and pulley, in radians. For a cord in complete semi-circular contact with the pulley, the angle between the two ends of the cord at their tangent points with the pulley is 180°, or π in radians.

Substituting equation (3) into equation (2) and π for β yields:

$$F=T_1 e^{(\mu k \pi)}-T_1$$

$$F=T_1[e^{(\mu k \pi)}-1]. \quad (4)$$

The distance travelled by the pulley in a unit of time is the circumference of the pulley times the number of revolutions per unit of time:

$$Distance(m)/Time(s)=\pi d_p * rev/s; \quad (5)$$

where $d_p$ is the diameter of the pulley in meters. Substituting equations (4) and (5) into equation (1) yields:

$$P(W)=T_1[e^{(\mu k \pi)}-1]*\pi d_p * rev/s. \quad (6)$$

$T_1$ is defined by the force due to gravity acting on the weighted receptacle, which is:

$$T_1 = mass(kg)*acceleration\ due\ to\ gravity(m/s^2)$$

$$T_1 = mass(kg)*9.8(m/s^2) \quad (7)$$

Substituting equation (7) into equation (6) and re-arranging to isolate the unknowns yields the normalized power relationship:

$$P/[[e^{(\mu k \pi)}-1]*\pi d_p]=9.8(m/s^2)*mass(kg)*rev/s. \quad (8)$$

The units on equation (8) simplify to W/m of pulley diameter. For a constant wind tunnel test setup, where the prony brake pulley and cord remain unchanged, the denominator of the left hand side of equation (8) remains constant. Hence, any observed changes in performance are attributable to the numerator of equation (8), meaning that relative power outputs can be reliably compared between models.

Example 1

Three Rotor Portion Models with Dividers

In the wind tunnel, single section three rotor portion models were prepared, substantially as shown in FIG. 1. The normalized power curves for this series of experiments are presented in FIG. 7. The data set labeled "Ben w/mid open divider" relates to a turbine identical to that shown in FIG. 1. The data set labeled "Ben w/mid closed divider" relates to a turbine similar to that shown in FIG. 1, but with a closed divider i.e. not containing any apertures 3 to permit airflow therethrough. The data set labeled "Ben 5 closed dividers" relates to a turbine similar to that shown in FIG. 1, but with five closed dividers rather than a single divider at the vertical midpoint of the rotor. The data set labeled "Ben w/mid open w/plate" relates to a turbine similar to that shown in FIG. 1, but with a vertical deflector plate provided on the concave side of the horizontal cross section of the rotor.

Figure 7:
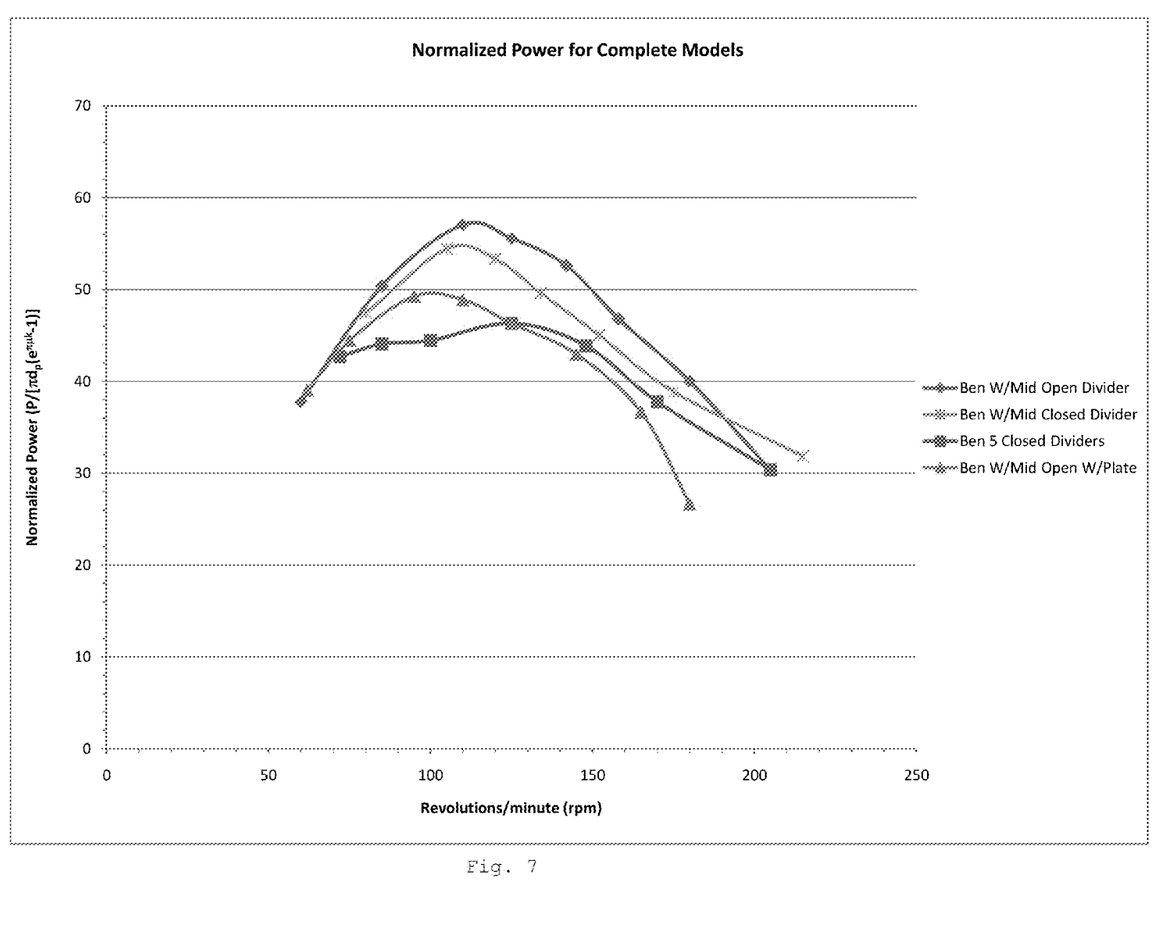
FIG. 7 shows normalized power curves for a number of embodiments of turbines according to the present invention comprising three rotor portions.

In reviewing FIG. 7, it can be seen that the maximum relative power was obtained with the embodiment shown in FIG. 1. Closing the aperture in the divider was detrimental to power output, as were adding additional dividers or a vertical deflector plate. Although not shown here, models with only two rotor portions performed poorly compared to those with three rotor portions and models without the top plate performed poorly relative to those with the top plate.

Example 2

Wind Tunnel Testing of Three Rotor Portion Models

Wind tunnel testing was conducted to determine power and torque curves for two different wind turbine configurations according to the present invention. The wind tunnel selected was the Boundary Layer Wind Tunnel Laboratory at the University of Western Ontario (London, Canada). The tunnel had dimensions and specifications as set out in Table 1, below:

TABLE 1

Wind Tunnel Dimensions and Specifications

| Length (m) | Width (m) | Height (m) | Maximum Speed (km/hr) |
|---|---|---|---|
| 33 | 2.4 | 2.15 to 1.5 | 55 km/hr |

The wind tunnel utilized a 12-bit Data Acquisition System (DAQ) in order to gather data relating to upstream wind speed sampled from pitot tubes at three locations across the width of the tunnel and averaged. Variation in wind speed across the wind tunnel was less than 5%. Dimensions of the test models were 13 inches diameter by 39 inches in height. Tunnel blockage due to the models and associated test equipment was less than 8%. The test models were made of steel and were of equivalent weight.

The models were put on a tubular steel test stand in the wind tunnel with a height of 15" from the wind tunnel floor to the bottom of the mounting disc. A stub shaft extending from the bottom of the mounting disc was supported on the test stand by a bearing having frictional loss of less than 3%. A magnetic particle brake was used to supply a variable level of resistance to the stub shaft, to which it was mounted. Rotation of the brake with the stub shaft was resisted by a torque arm, which was attached at one end to the exterior of the particle brake and at the other end to a fixed support of the tubular test stand. The torque arm had a length of 12" from the center of the stub shaft to its distal end, which was attached to the fixed support via a strain gauge. Measurement of the strain allowed the torque applied to the shaft by the particle brake to be calculated.

Two test models were utilized. The first model was according to the embodiment of FIG. 1 and had a top with a convex portion, but no internal dividers. The second model was according to the embodiment of FIG. 3, with a top having a convex portion as well as a leeward angle of 2 degrees relative to vertical.

Figure 8:
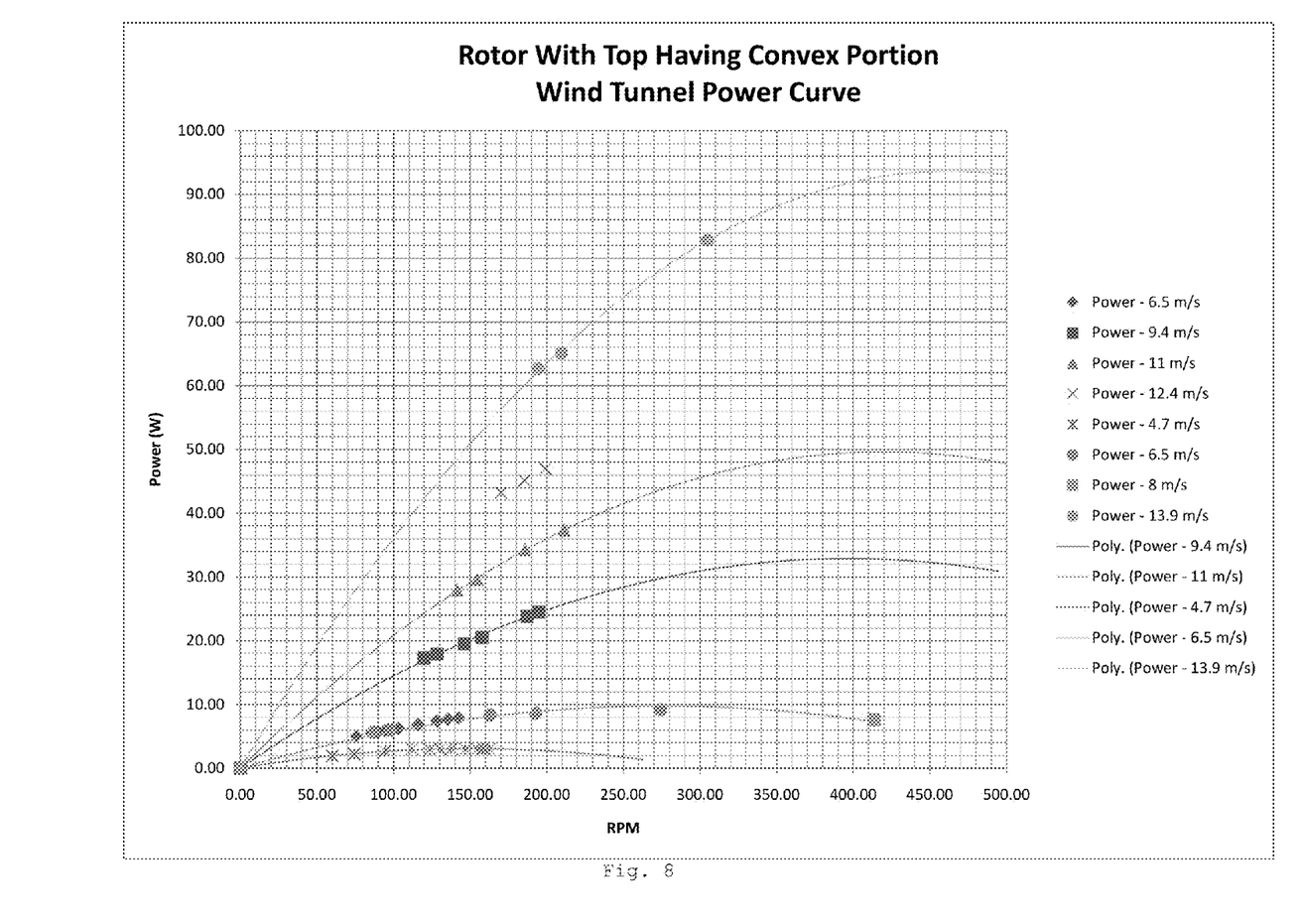
FIG. 8 shows a power curve for an embodiment of a turbine according to the present invention, comprising a top having convex portions.

The test procedure was to select a wind speed for test purposes and allow the wind tunnel to achieve steady state, as determined by the upstream pitot tubes. A magnetic particle brake setting was adopted by adjustment of the applied voltage using a variable power supply. Measurements were taken only once steady state conditions had been achieved in terms of rotational speed following setting of the magnetic particle brake. Strain data and stub shaft rotational speed (revolutions per minute, rpm) were logged and averaged over a 10 s interval for each measurement. Once measurements had been completed, the magnetic particle brake was adjusted to a higher or lower value and the turbine was allowed to reach a new steady state speed before measurements were logged. A series of brake settings and corresponding torque and rotational speed readings were thereby obtained for each wind speed setting. The wind speed settings and corresponding power values obtained with the various brake settings are shown in FIG. 8 for the first test model and in FIG. 9 for the second test model. The torque values corresponding to the power measurements of FIG. 9 are shown for the second test model in FIG. 10.

Figure 9:
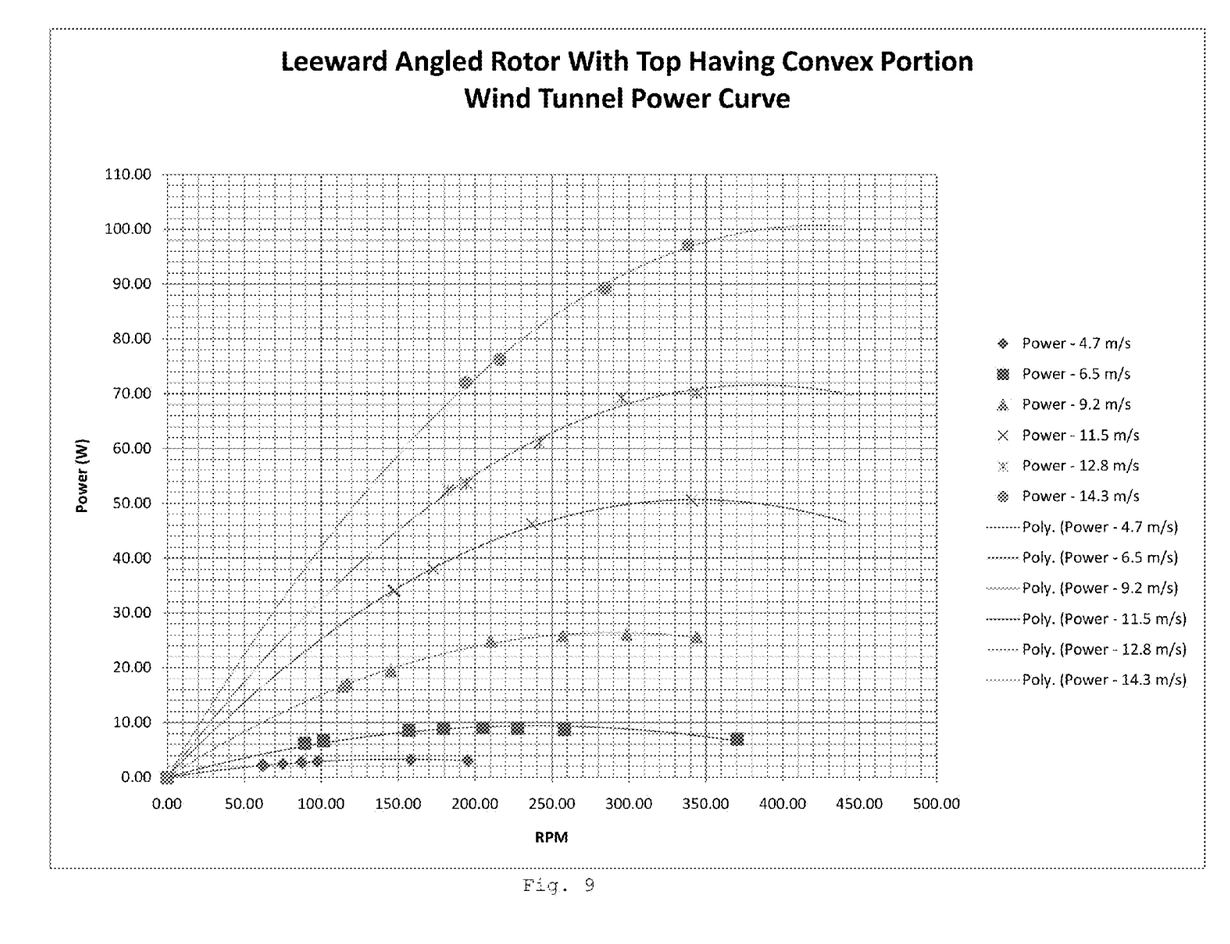
FIG. 9 shows a power curve for another embodiment of a turbine according to the present invention, comprising a top having convex portions and a leeward angle; and, FIG. 10 shows a torque curve corresponding to FIG. 9.
Figure 10:
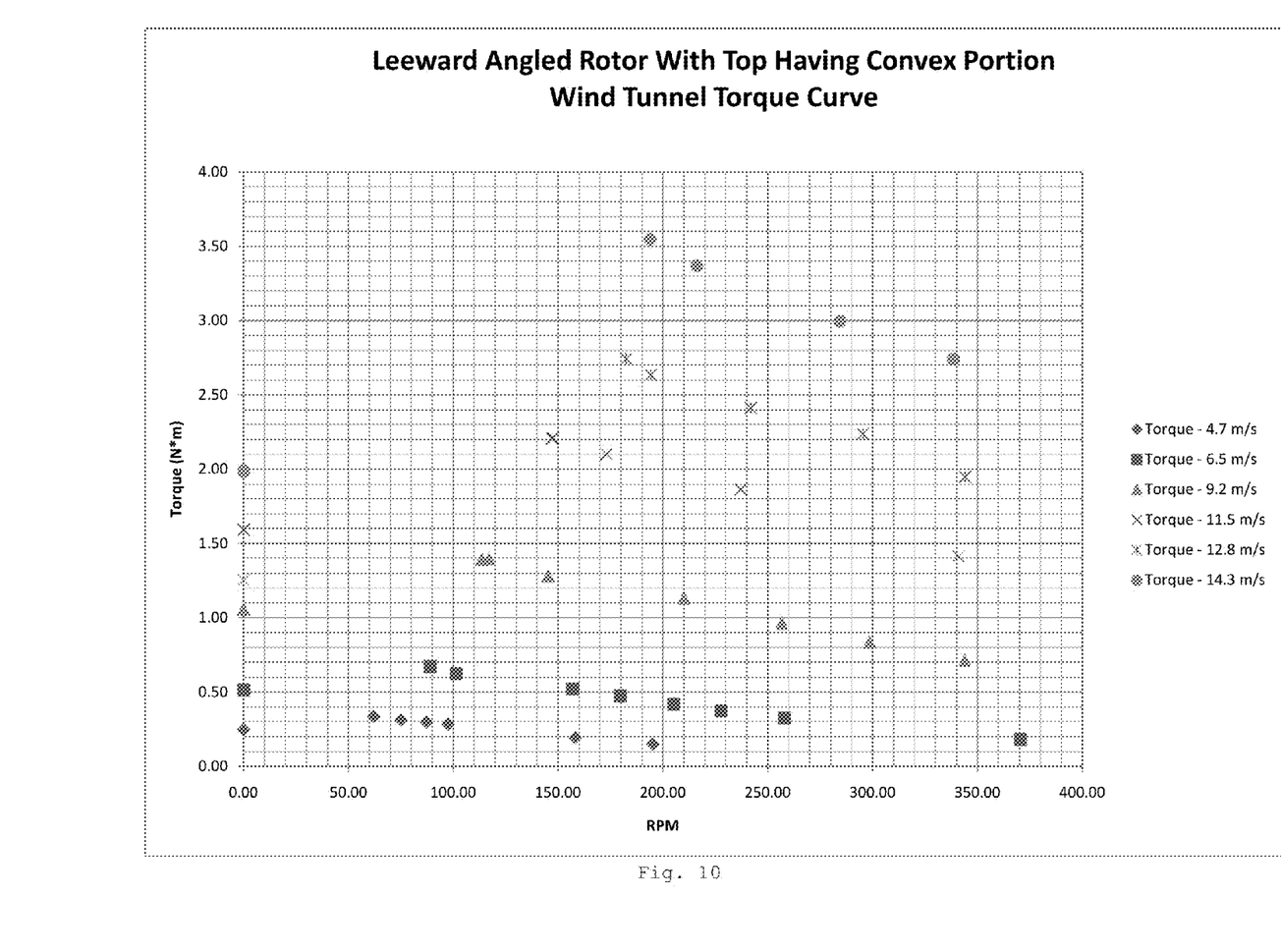

As can be seen by comparing FIGS. 8 and 9, the second test model produced consistently higher maximum power values at each wind speed. In addition, the maximum power was obtained at a lower rotational speed (rpm) for the second test model, indicating that it produced more torque than the first test model. This is useful for wind turbines, as increased torque relates to lower starting speeds and, consequently, more useful work done over the course of a day.

Having described preferred embodiments of the invention, it will be understood by persons skilled in the art that certain variants and equivalents can be substituted for elements described herein without departing from the way in which the invention works. It is intended by the inventor that all subcombinations of features described herein be included in the scope of the claimed invention, even if not explicitly claimed.

The invention claimed is:

1. A vertical axis wind turbine having at least one turbine section comprising at least two rotor portions adjacent one another and configured to cause rotation of the turbine about the vertical axis, each rotor portion having a bottom, a top, and a curved horizontal cross section when seen in top view, the section comprising a top cap bounding the rotor portions having a convex portion corresponding to each rotor portion that extends in a windward direction relative to the horizontal cross section of each rotor portion.

2. The turbine according to claim 1, wherein each rotor portion comprises a horizontal interior divider containing at least one aperture to permit the passage of air therethrough.

3. The turbine according to claim 2, wherein the divider is located at substantially a vertical midpoint of the rotor portion.

4. The turbine according to claim 1, wherein the turbine section comprises three rotor portions.

5. The turbine according to claim 1, wherein the curved horizontal cross section when seen in top view comprises an airfoil shape.

6. The turbine according to claim 1, wherein the curved horizontal cross section when seen in top view comprises a straight section and a curved leading edge section.

7. The turbine according to claim 1, wherein each rotor portion comprises two angled rotor sections that meet at substantially a vertical midpoint of the rotor portion, one of the two rotor sections of each rotor portion extending downwardly from the top cap.

8. The turbine according to claim 7, wherein the angled rotor sections comprise an angle that is in a leeward direction.

9. The turbine according to claim 8, wherein the angle is from 1 to 20 degrees with respect to vertical.

10. The turbine according to claim 8, wherein the angle is from 1 to 5 degrees with respect to vertical.

11. The turbine according to claim 7, wherein the angled rotor sections comprise an angle that is in a radical direction.

12. The turbine according to claim 11, wherein the angle is from 1 to 20 degrees with respect to vertical.

13. The turbine according to claim 11, wherein the angle is from 1 to 5 degrees with respect to vertical.

14. A vertical axis wind turbine having at least one turbine section comprising at least two rotor portions adjacent one another and configured to cause rotation of the turbine about the vertical axis, each rotor portion having a bottom, a top, and a curved horizontal cross section when seen in top view, the section comprising a top cap bounding the rotor portions, each rotor portion comprising two angled rotor sections that meet at substantially a vertical midpoint of the rotor portion, one of the two rotor sections of each rotor portion extending downwardly from the top cap.

15. The turbine according to claim 14, wherein the angled rotor sections comprise an angle that is in a leeward direction.

16. The turbine according to claim 15, wherein the angle is from 1 to 20 degrees with respect to vertical.

17. The turbine according to claim 15, wherein the angle is from 1 to 5 degrees with respect to vertical.

18. The turbine according to claim 14, wherein the angled rotor sections comprise an angle that is in a radial direction.

19. The turbine according to claim 18, wherein the angle is from 1 to 20 degrees with respect to vertical.

20. The turbine according to claim 18, wherein the angle is from 1 to 5 degrees with respect to vertical.

* * * * *